United States Patent [19]

Aschke

[11] Patent Number: 5,094,307

[45] Date of Patent: Mar. 10, 1992

[54] WEIGHING SCALE WITH TWO OVERLAPPING WEIGHING BEAM ARRANGEMENTS

[75] Inventor: Walter Aschke, Hamburg, Fed. Rep. of Germany

[73] Assignee: Seca GmbH, Hamburg, Fed. Rep. of Germany

[21] Appl. No.: 561,971

[22] Filed: Aug. 2, 1990

[51] Int. Cl.⁵ .......................................... G01G 21/08
[52] U.S. Cl. ............................... 177/256; 177/DIG. 9
[58] Field of Search .......................... 177/256, DIG. 9

[56] References Cited

U.S. PATENT DOCUMENTS

| | | | |
|---|---|---|---|
| 3,460,642 | 8/1969 | Provi et al. | 177/256 |
| 3,658,144 | 4/1972 | Corbitt | 177/DIG. 9 |
| 4,458,771 | 7/1984 | Hanssen et al. | 177/256 |
| 4,479,562 | 10/1984 | Mairot et al. | 177/256 |
| 4,832,142 | 5/1989 | Germanton | 177/256 |

Primary Examiner—George H. Miller, Jr.
Attorney, Agent, or Firm—Toren, McGeady & Associates

[57] ABSTRACT

A weighing scale with two overlapping weighing beam arrangements hinged in the middle of the weighing scale by means of connecting rods with pivot bearings and pivots and connected to a ground plate at the extremes has a pendulum foot (19) at the ends of each weighing beam arrangement which can swivel in a foot groove on the ground plate (39). The ends of the weighing beam arrangements accommodate a pivot block arrangement with two opposed pivots (50, 51). Support in pivot bearings is located beneath the weighing beam arrangement. The pivot block arrangements and the pivot bearings are located in the centre with regard to the weighing beams and transmit the support forces from the center to the weighing beams.

8 Claims, 9 Drawing Sheets

WEIGHING SCALE WITH TWO OVERLAPPING WEIGHING BEAM ARRANGEMENTS

The invention is a weighing scale with two overlapping weighing beam arrangements hinged in the middle of the scale by means of connecting rods with pivot bearings and pivots and hinged at the extremes to a ground plate in connection with a toothed rack mechanism gripping into a cogwheel for weight indication with a lever arrangement.

Such weighing scales are already familiar as bathroom scales in flat design. In such conventional scales also, at least one of the weighing beam arrangements is U-shaped with a knife-edged pivot at two arms on the ends of the beams whereas the other weighing beam arrangement consists of two levers whose outer extremes are supported on a knife-edge pivot and whose inner extremes grip into a connecting rod.

This model is known, for example from the DE OS 26 36 141.

In this case the U-shaped weighing beam arrangement is fitted with the gear wheel for the toothed rack. In the familiar model, the weighing beams consisting of a steel plate profile vertical to the ground plate are pivoted by means of pan-type notches on fixed supports arranged on the ground plate for all beam ends. This leads to a low capacity for adaptation as shifts in the pivot support can lead to ratio deviations facilitated by the connection rods. Indication is also inaccurate as the allocation to the hinged bearings is undefined with regard to the supports for a weighbridge. These supports are provided near the extreme ends of the of the weighing beam arrangement.

In the conventional model also, the U-shaped weighing beam arrangement is supported by a main spring which may be adjustable and which forms the actual support for the device.

The invention is not restricted to this this type of support. The principle is integrated that measurement doses can also be arranged whereby the toothed racks are omitted and a digital display provided.

The conventional models have the disadvantage of inaccuracy because the pivots of the weighing beam arrangements are undefined allowing play in at least one direction, including longitudinally or laterally, in order to allow assembly in the first place. The rigid support on the ground plate leads to further inaccuracy as lateral and longitudinal forces occur through movement of the hang-type connection rack influencing the pivots at the ends of the weighing beam arrangements thus causing both inaccuracy and a short life of the mechanical parts concerned.

Thus conventional models also use especially hard material for pivots in weighing beam arrangements in the form of an upturned U. Such pivots project laterally from the weighing beam. They are connected to the ground plate by means of suspensions hung into the bearers above the pivots. This arrangement is fairly high as the weigh bridge still has to come on top. The lateral suspension causes forces with bending moment in the weighing beam arrangements so that the advantage of more exact pivot bearing is impaired by the one-sided load on the weighing beam arrangements.

Although suspension on a bearer allows the possibility of adaptation of the outer extremes of the weighing beam arrangement, it has the disadvantage that it leads to a floating support of the weighbridge. Especially in the case of personnel weighing scales, inaccuracies can be caused when a thrust is exerted when mounting the scales not to mention the fact that there must be a certain amount of tolerance for such thrust. Although this may be tolerable in view of the more accurate support it leads, however, to additional undefined loads in various directions which influence the pivots.

The invention represents a weighing scale which, with a practically unshiftable weigh bridge, allows the guidance of same in a flatter arrangement than up to now as it provides the necessary give in accordance with the load thereby improving precision of the force exerted on the weighing beam arrangements.

The problem was solved by pivoting the ends of the weighing beam arrangement on a pendulum foot in accordance with a foot groove in the ground plate and providing the ends of the weighing beam arrangement with pivot blocks with two basically counteractive pivots with support in pivot bearings below the weighing beam arrangement.

The pendulum feet allow a successive movement parallel to the ground plate with the advantage that there is no vibration when a load is accepted thereby ensuring vertical guidance of the weighbridge while this type of support from below facilitates the special pivot block arrangement within the U-shaped weighing beam. Lateral deviation and distortion due to forces on the pivot bearings are thus avoided.

As well as being a simpler mechanism, the support from below also means that the scale is flatter, an advantage which is now achieved with increased accuracy.

In this respect the location of the pivot blocks and the pivot bearings in the centre in relation to the weighing beams so that the forces are transmitted from the centre to the weighing beams is especially advantageous. In this way increased accuracy is achieved with less material.

A centering device is provided for the pendulum foot in such a way that a spigot on the ground plate goes through a hole with play in a connecting surface between the sides of the pendulum foot. This fixes the pendulum foot while allowing it to move.

The lower part of the pendulum foot has projecting shoulders at the sides of its arms fitted with a roller leaving a free space between them whereby the narrowest part of the space is at the level of the arched bearing surfaces so that the tongues coming up from the ground plate can grip into the spaces.

This is an easy-to-produce and effective principle which is improved in another version in such a way that the projecting shoulder consists of a tongue punched out of the ground plate or a plate connected to the ground plate and bent upwards through the space thereby holding the pendulum foot at a certain position on the ground plate.

In another version, the shoulders have pivot-type tapers towards the centre, i.e. towards the space, so that with a certain amount of play to the tongue they ensure correct orientation of the pendular movement.

In the most favored version the abovementioned pivot block arrangement is a component with two parallel ridges in the form of pivots on mutually opposed edges and held rigid to each other by longitudinal ridges. These pivot block arrangements are fitted into the ends of the weighing beams. They are specially fitted and provided with abutment. The pivot block arrangement is a rigid component so that the pivots are no longer moveable in relation to each other which would be possible under load if mounted in a metal bearer. The block arrangement with the parallel ridges also allows use in the U-shaped bearers of the weighing beam arrangements without causing alterations.

The absolute orientation of both pivots to each other relieves the arrangement in the bearer so that this can be manufactured in a lighter version than up to now.

The version in which the ends of the weighing beam arrangement are located on the weighbridge near the cogwheel for indication and firmly fixed to the ground plate also includes a particularly advantageous arrangement of the weighbridge in conjunction with a guide. Even in this case, however, the pivot block arrangements are used at the abovementioned ends with the above-mentioned advantages.

The invention is explained using examples of different versions represented in the drawings. The drawings show.

Figure 1:
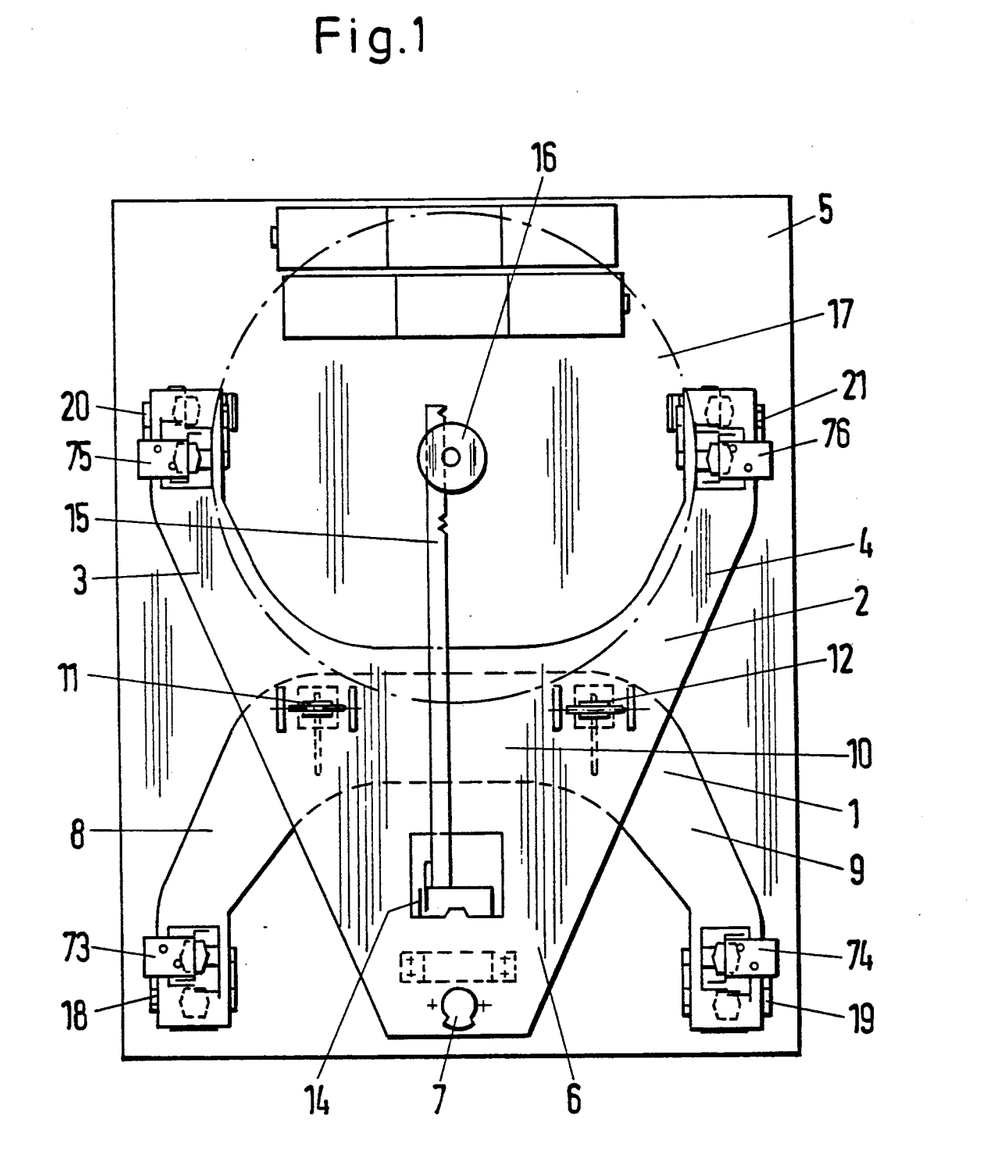
FIG. 1: plan of a beam arrangement of a weighing device in partial representation including the supports for a weighbridge not shown
Figure 2:
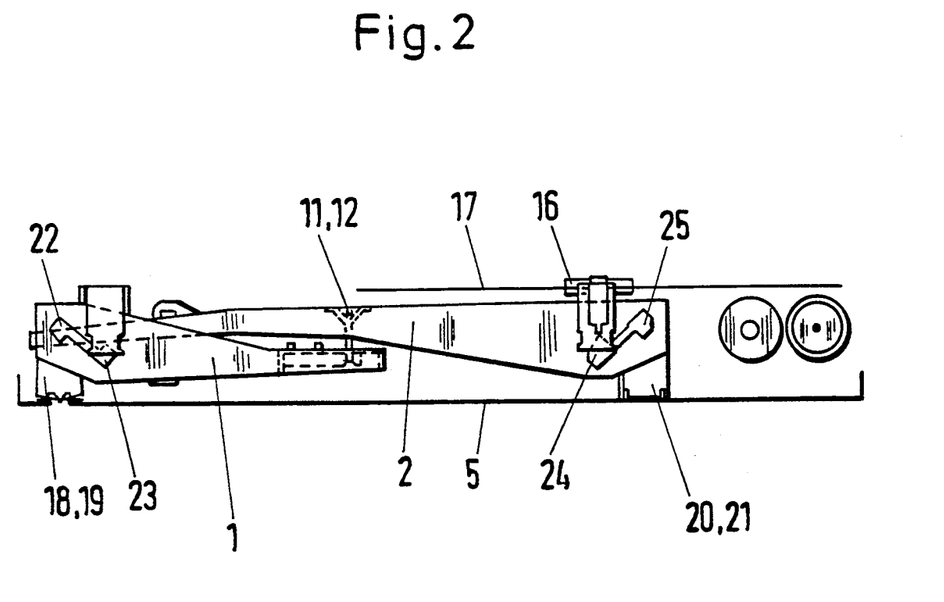
FIG. 2: side view of FIG. 1 in part representation

FIGS. 1 and 2 provide an overall schematic diagram of the weighing scale.

In accordance with FIG. 1 a flat personnel scale particularly a bathroom scale has two basically U-shaped weighing beam arrangements 1, 2, of which the weighing beam 2 with its arms 3, 4 is pivoted on an abutment fixed to the ground plate 5 of the scale while the other end where the arms meet is also supported on the ground plate 5 by means of a spring arrangement 7. The weighing beam 1 is pivoted in a special way with the end of the arms 8, 9 on the ground plate 5 and connected with the ridge 10 joining the two arms with the middle of the arms 3, 4 of the weighing beam 2 by means of suspension connecting rods 11, 12.

In order to provide a complete picture it is noted that an adjusting lever 14 for a toothed rack 15 is hinged to the weighing beam arrangement 2 in a manner not to be described wheel 16 which drives the needle on the indication plate 17.

In the favoured version the ends of the arms 3, 4; 8, 9 of the weighing beam arrangements 1, 2 are not connected to the ground plate 5 by means of a suspension, which in the conventional version leads to a suspension arrangement with bearers above the weighing beams.

Support is provided on the ground plate 5 and then by means of the pendulum feet 18, 19 with fixed supports 20, 21 for the weighing beam 2.

If floating support was tolerated, pendulum feet could also be used here. The basic principle is that the support is always provided from below and at least at one end of one of the weighing beam arrangements 1, 2. The pendulum foot support has the advantage that the pivots with the rhombus form in cross section 22, 23 (FIG. 2) are supported on the ground plate 5.

The rhombus profiles 22, 23 are arranged in the area of the pendulum feet 18, 19 and the fixed supports 20, 21. In this area they are designated by 24, 25.

Figure 3:
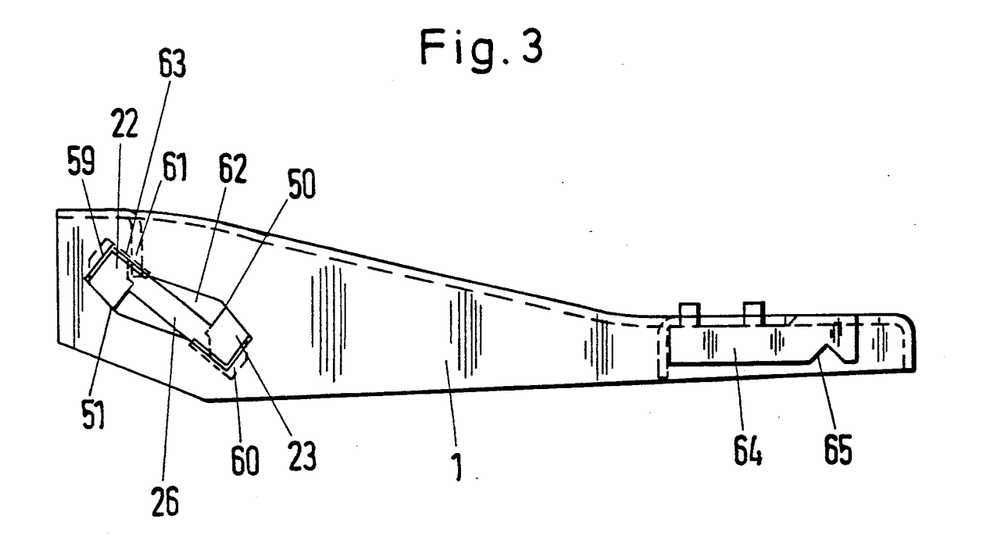
FIG. 3: a part side view from the drawing in FIG. 2 in a larger scale to explain details

In FIG. 3 the arrangement is illustrated by the weighing beam 1. An arm is represented in which a pivot block 25 with the profiles 22, 23 and, particularly, the pivots 50, 51 on these, is shown. The pivot block arrangement is pressed into the ridge of the arm of the weighing beam 1 which runs parallel to the drawing plane. Centering devices 59, 60 provide a lateral orientation and the tongue 61 secures the position in a recess 62 in the arms. This increases accuracy whereby a gripping profile 63 is provided to accommodate the tongue 61. Most particularly, it ensures the absolutely constant relationship of the pivots 50, 51 to each other.

This also applies to the other pivot block arrangements shown.

In order to provide a complete picture it is noted to FIG. 3 that in the area of the suspensions 11, 12 (FIGS. 1 and 2) a hardened piece of metal 64 is inserted into the hollow profile with an open pan 65 where a pivot grips which is held by a bridging suspension. The pivot may also be integrated in the suspension.

An important characteristic is the pendulum foot already mentioned above under 18, 19. The pendulum foot is illustrated in various views in the FIGS. 4 to 8. It provides support from below and can roll in accordance with longitudinal movement of the weighing beam arrangement making a frictionless successive movement possible while the support from below in the middle of the arm of the weighing beam is ensured with this precise mobility, and shifts are avoided by the grip from the ground plate.

Figure 4:
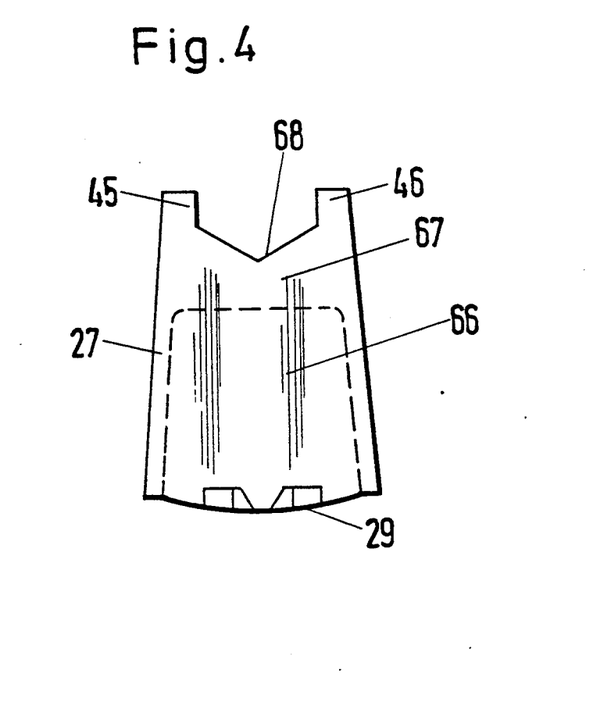
FIG. 4: a side view of a pendulum foot in the basic version with accommodation for a pivot bearing
Figure 6:
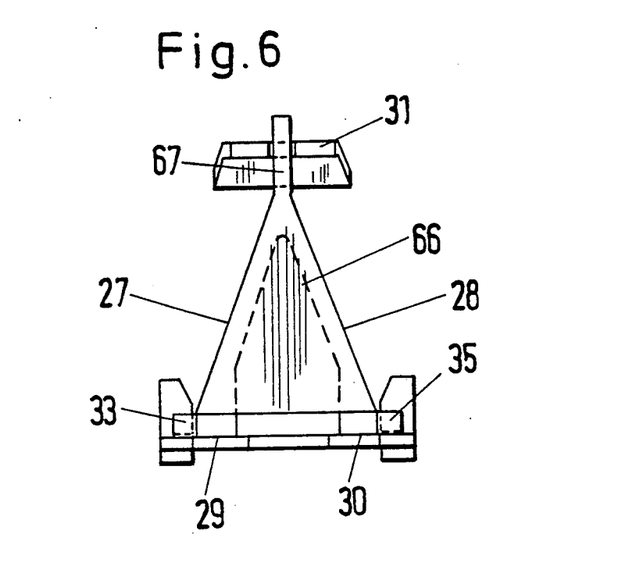
FIG. 6: a side view of a pendulum foot seen from a right angle with respect to FIG. 4 with an inserted pivot groove and floor plate

As shown in FIG. 6 the pendulum foot has two arms 27, 28. These arms, of which one 27 is shown in FIG. 4, have concave resting surfaces 29, 30 with which they can roll on the ground plate. See also FIG. 8.

Figure 5:
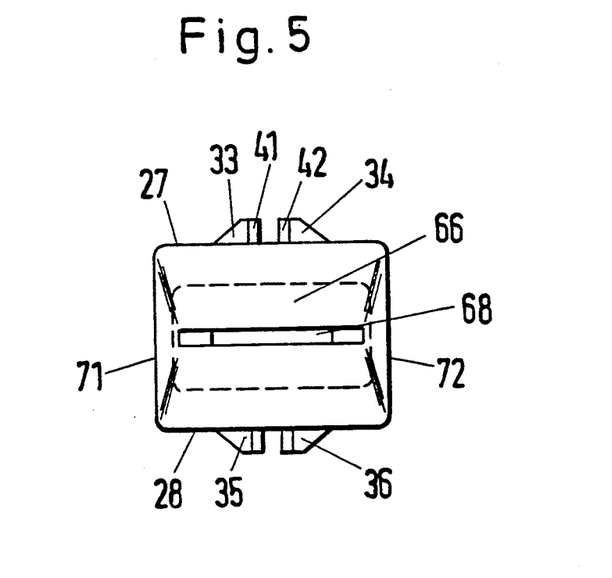
FIG. 5: a plan of FIG. 4
Figure 7:
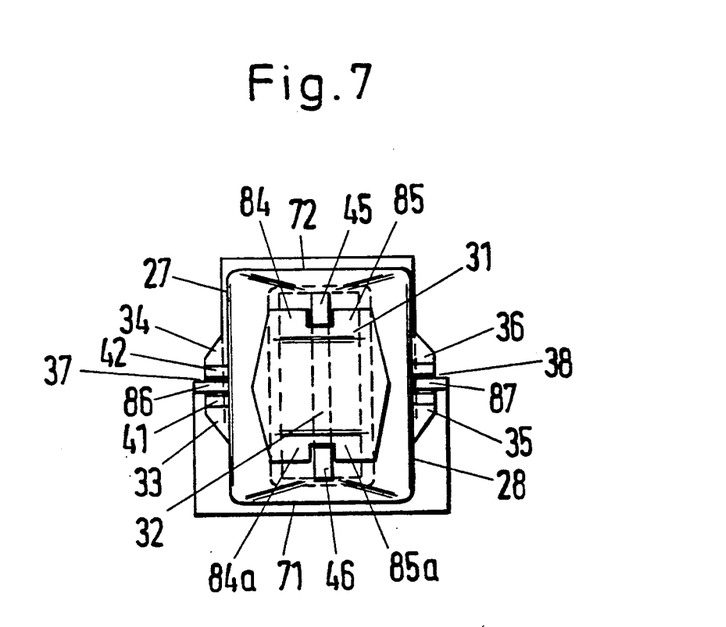
FIG. 7: a plan of FIG. 6 representing the pivot groove including a ground plate section with upwardly projecting shoulders
Figure 9:
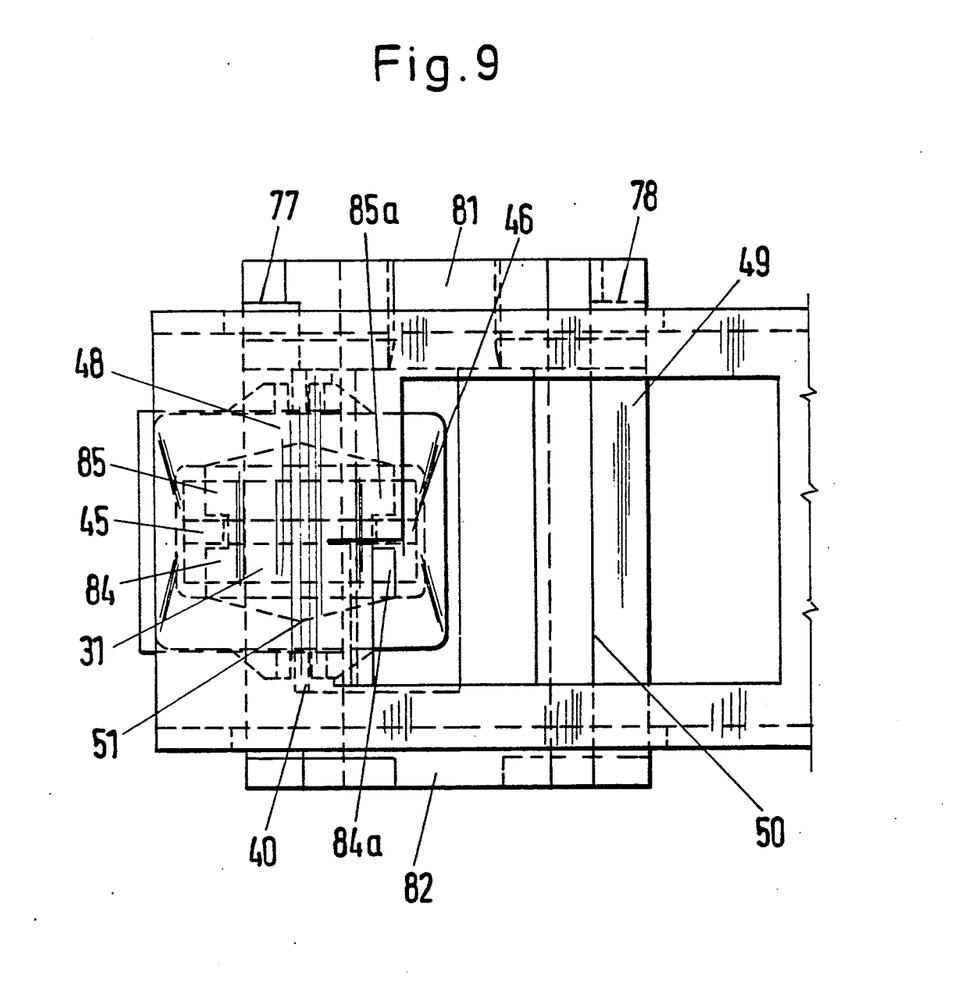
FIG. 9: a plan of FIG. 8 seen in the direction of the arrow IX in FIG. 8

The arms 27, 28 are separated from each other by a hollow space 66 providing particularly strong strut support. The hollow space 66 is also shown in FIG. 4. Here one can see that a middle ridge 67 is located symmetrically at the top of the arms 27, 28 and a resting profile 68 for a pan 31 serves as a pivot. The pivot pan 31 is shown in FIG. 7. The upwardly protruding shoulders 45, 46 (FIG. 4) can be seen beside the pivot pan. The arms 27, 28 can also be seen from above. The face sides 71, 72 are shown in FIGS. 5, 7, 9.

The unit is thus a hollow bearer with high stability due to its design with accommodation for a hardened pan.

Figure 8:
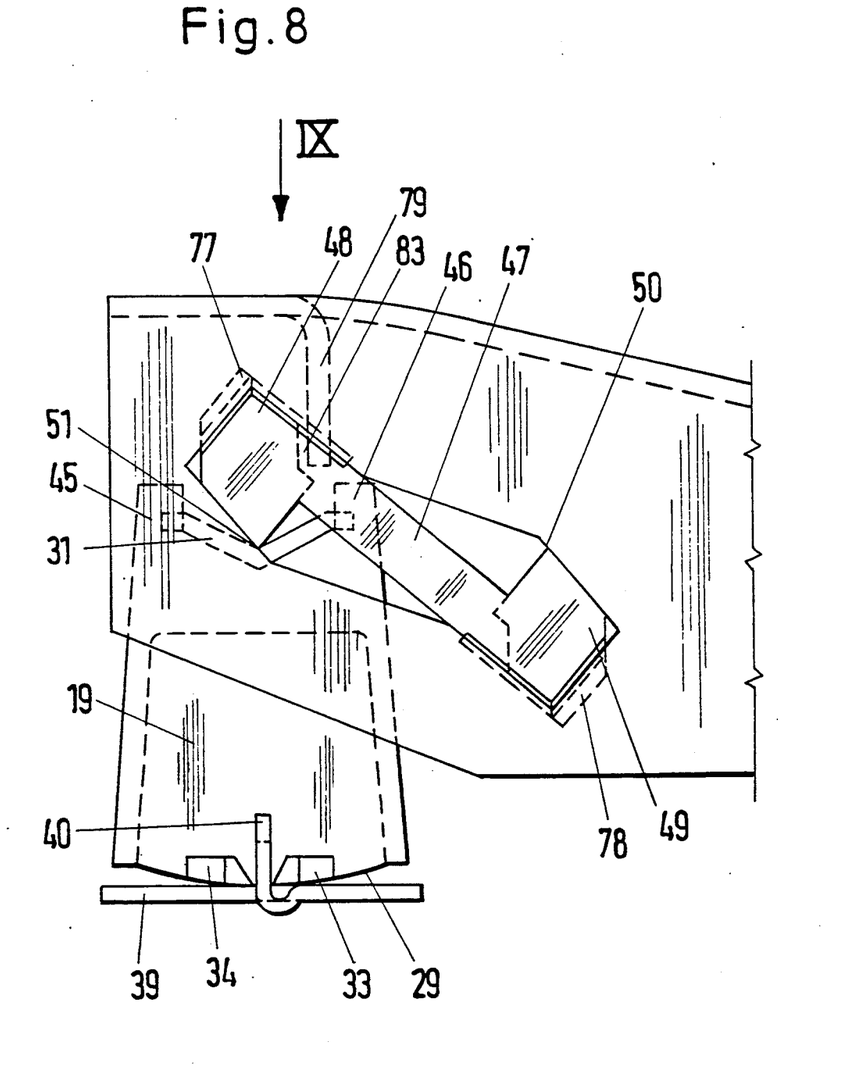
FIG. 8: a part side view of a pendulum foot corresponding approximately to the view in FIG. 4 but in connection with the ground plate and with pivot block arrangements at the end of a weighing beam.

In the middle of the supporting surfaces 29, 30 there are protruding shoulders 33, 34; 35, 36. Shoulders protrude upwards into the spaces 37, 38 to ensure centering in the event of a shift. As shown in FIG. 8 these shoulders may consist of a tongue 40 punched out of the ground plate or a plate 39 fixed to the ground plate and bent upwards into the spaces 37, 38 as in FIG. 7 thereby holding the pendulum foot at a certain position on the ground plate 5. The shoulders 33, 36 have pivot-type tapers 41, 42 towards the centre, i.e. towards the space, so that with a certain amount of play to the tongue 40 they ensure correct orientation of the pendular movement while preventing lateral deviation.

The pan 31 and the pivot bearing 32 described above are shown in FIG. 7. The pan 31 (FIG. 6) is made of a hardened material and grips into the shoulders 45, 46 for longitudinal orientation and the profile 68 in order to ensure correct orientation under load.

The pan 31 can also have projections at the edges to accommodate the upper ridge on the arms 27, 28 of the pendulum feet 18, 19.

On observation of the figures up to now it must be taken into account that in FIG. 1 the supports 20, 21 and the bearings 73, 74; 75, 76 for the weighbridge are arranged on the pendulum feet 18, 19. This is noted here to illustrate the function as the lever ratios are derived from this.

FIG. 8 shows a pivot block arrangement 47 with the pivots and pivot rails 48, 49 which are pressed as a unit into the edge ridges of the arms 3, 4; 8, 9 of the weighing beams 1 and 2. The pivot 50 grips into the pan of the bridge pivot bearing while pivot 51 grips into the pan 31 of the pendulum foot 19.

See FIGS. 4 and 5 for layout. Take note in particular in FIG. 8 that the upward profiles 77, 78 on the pivots 48, 49 serve for lateral orientation on mounting of the pivot block arrangement 47 which is thus rigidly mounted. FIG. 8 also shows the angled projection 79 which holds the pivot block arrangement 47 on the arms of a weighing beam.

The use of such an angled and thus adaptable projection 79 in terms of position is a positive characteristic. A recess 83 is provided to accommodate this projection in gripping the pivot or pivot rail 48, 49. The lower limit of the recess 83 can also be used to prevent upward movement.

FIG. 9 is a plan of FIG. 8 explaining this arrangement with the pivot rails 48, 49. In comparison with the other drawings it is clear that there is a rigid frame with lateral ridges 81, 82 for the the pivot rails. This frame consisting of parts 48, 49 and 81, 82 is a rigid component which ensures that the actual pivots are always in a fixed position in relation to each other. It is also possible here to use the lateral ridges to reinforce the arms of the U-profile of the frames of the weighing beams.

The rigid square component consisting of the pivot rails 48, 49 and the lateral ridges 81, 82 is pressed into the end of a weighing beam arm, whereby lateral upward profiles 77, 78 at the ends of the pivot rails 48, 49 ensure lateral orientation of this component so that mounting by pressing and the lateral orientation are facilitated.

This set-up is clear from FIG. 9 in conjunction with FIG. 8 and the bearing pan 31. One can see that this bearing pan accommodates the shoulders 45, 46 with its projections 84, 85 and 84 a, 85 a respectively. The pan consisting of hardened material is thus held adaptably in position whereby a pendulum foot support is located on the plate 39 in the version in FIGS. 6 to 8. In FIGS. 7 and 8 one can see the bent-up tongues designated as 40 in FIG. 8 and bent from a plate 39 with the upwardly projecting shoulders 86, 87. Thus the pendulum foot can move along the connecting line between the shoulders 86, 87, giving under the movement of the connected weighing beam.

The movement of the pivot 51 with the pan 31 is also accounted for whereby the pan is guided adaptably by the shoulders 45, 46. This ensures that the respective distance is exactly maintained. It is also shown how the pendulum foot is held on its support.

Although only the tongues 40 have been mentioned, it may be taken for granted that other centering devices may also be provided, for example in the form of screw shafts or tips projecting from the plate 39 into holes or borings in the pendulum foot with a certain amount of play. Such centering devices may also be designed to provide resilience.

Figure 10:
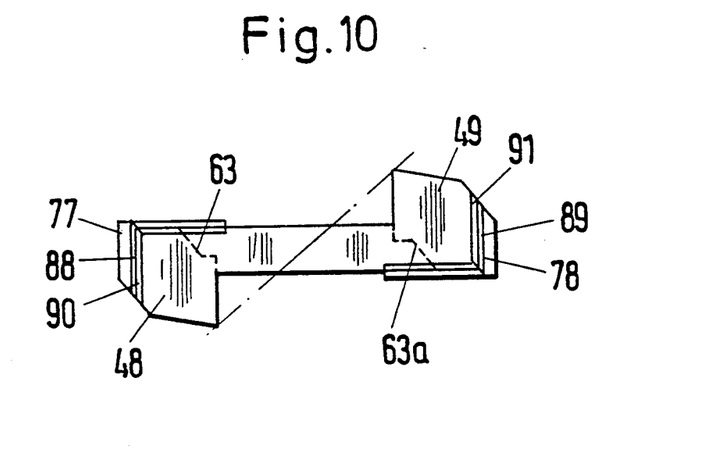
FIG. 10: a side view of a pivot block
Figure 11:
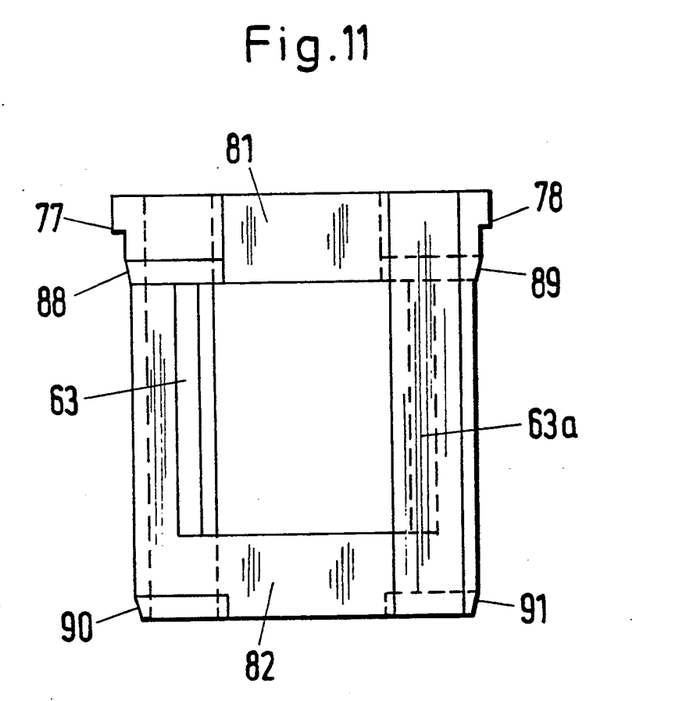
FIG. 11: a plan of such a pivot block

As the component consisting of the pivot rails 48, 49 and the pivots 50, 51 is of particular importance, also in conjunction with the lateral ridges 81, 82 in forming a framework structure, this unit is represented in particular detail in the FIGS. 10 and 11. These show the diverse recesses and especially the upward profiles 77, 78 also clear in FIG. 10 which ensure correct lateral application.

The bevels 88, 89 in FIG. 11 are also apparent in FIG. 10 whereby it is clear, as in FIG. 9, that the lateral application by means of the tapered surfaces provides a particularly favourable construction. FIG. 10 also shows the bevels 90, 91 near the other ridge 82 to facilitate lateral introduction.

With reference to the pivot rails the grip profiles 63 and 63 a are also apparent.

This provides a rigid frame which is easy to install, firmly mounted and further secured by a tongue thereby providing an improved support for the weighing beam arrangements.

Figure 12:
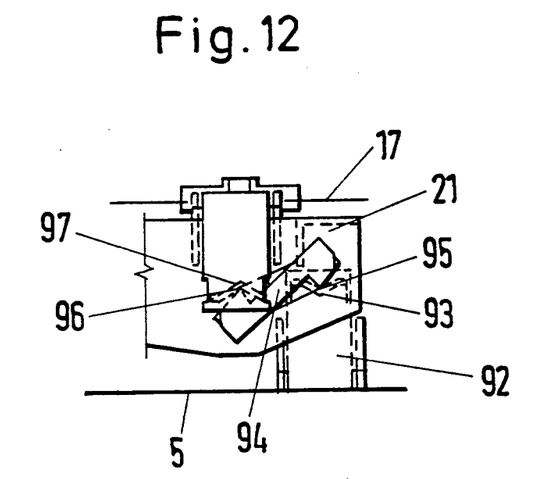
FIG. 12: a side view of the unshiftable support of a weighing beam arrangement on the ground plate
Figure 13:
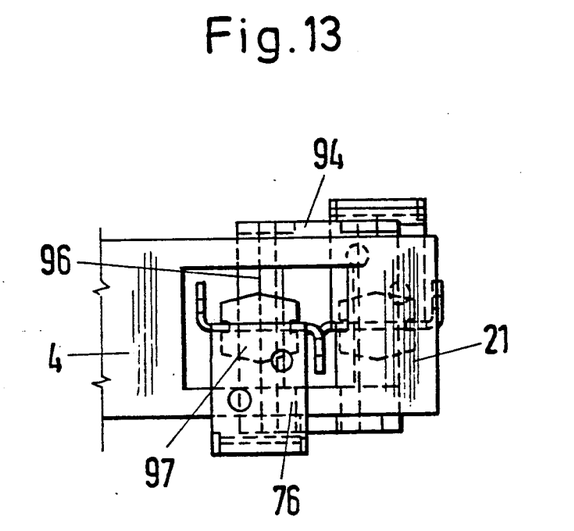
FIG. 13: a plan of FIG. 12

FIGS. 12 and 13 show an example of support 21 at the arm 4 of the weighing beam arrangement 2. In both drawings it is apparent that the support 21 is firmly fixed to the ground plate 5. This support can be fixed by screws. The support 21 is formed by a column 92 which is provided with a pivot bearing 93 as is shown, for example, by the pivot bearing 32 in the explanation to FIG. 7.

It is apparent that rigidity is provided by means of profiles. It is also clear that a pivot block arrangement 94 is inserted into the end of the arm 4, as designated above with 47 and described. The pivot 95 sits in the pivot bearing 93, the other pivot 96 grips into pivot bearing 97 which is located on the arm 4. The pivot bearing 97 carries a bearing 76 for the weighbridge. This shows the rigid connection to the column 92 as the pivot block arrangement 94, as is the case with 47, also forms a rigid unwarpable frame resting in the arm 4 and bearing the warp-free supported pivot bearing in arm 4.

FIG. 12 shows the indicator or scale version 17 in accordance with the explanation above. As in the earlier version this is basically a disc with drive wheels or cogs 16 and a toothed rack 16. The expression indicator or scale version 17 is used in order to leave open the possibility of a rotating indicator or a rotating scale. It is also possible to fit a digital display (e.g. electric).

I claim:

1. A weighing scale with two overlapping weighing beam arrangements hinged in the middle of the scale by means of connecting rods with pivot bearings and pivots and hinged at the extremes to a ground plate in connection with a tooth rack mechanism gripping into a cogwheel for weight indication with a beam arrangement and characterized by the fact that the ends of one weighing beam arrangement are supported by movable pendulum feet (18, 19) corresponding to foot grooves in the ground plate (5) and that the respective ends of the weighing beam arrangements accommodate a pivot block arrangement with two basically opposed pivots (50, 51), whereby support is provided in pivot bearings below the top surface of the weighing beams.

2. Weighing scale in accordance with 1 characterized by the fact that a centering device is provided for the pendulum foot in such a way that a spigot on the ground plate (5) goes through a hole with play in a connecting surface between the sides of the pendulum foot.

3. Weighing scale in accordance with claim 2 characterized by the fact that the lower part of the pendulum foot has projecting shoulders (33, 34; 35, 36) at the sides of its arms fitted with a roller (27, 28) leaving a free space (37, 38) between them whereby the narrowest part of the space is at the level of the arched bearing surfaces (29, 30) so that the tongues coming up from the ground plate can grip into the spaces.

4. Weighing scale in accordance with one of the claims 1, 2 and 3 characterized by the fact that a pivot block arrangement (26, 47) is designed as a single component with two parallel ridges forming pivots at two mutually opposed ends.

5. Weighing scale in accordance with one of the claims 1 or 2 and characterized by the fact that a pivot block arrangement is kept rigid by longitudinal ridges and that this pivot block arrangement is inserted into the ends of the weighing beam arrangement.

6. Weighing scale in accordance with claim 3 and characterized by the fact that the protruding shoulders are punched out of the ground plate or a plate (39) fixed to the ground plate and bent upwards to form a tongue (40) which goes through the space (37, 38) and holds the pendulum foot at a certain position on the ground plate (5).

7. Weighing scale in accordance with claim 3 and characterized by the fact that the shoulders (33-36) towards the centre, i.e. towards the space have pivot-type tapers (41, 42) so that during the pendulum movement these shoulders ensure correct orientation with play to the tongue (40) and that the contact points of the shoulders with the tongues are on the same level as the rollers of the pendulum foot thereby minimizing friction.

8. A weighing scale with two overlapping weighing beam arrangement hinged in the middle of the scale by means of connecting rods with pivot bearings and pivots and hinged at the extremes to a ground plate in connection with a tooth rack mechanism gripping into a cogwheel for weight indication with a beam arrangement and characterized by the fact that the ends of one weighing beam arrangement are supported by movable pendulum feet corresponding to foot grooves in the ground plate and that in the center of the weighing beam arrangements are located pivot block arrangements and pivot bearings so that support is provided below the top surface of the weighing beams, and so that the support forces are transmitted from the center to the weighing beams.

* * * * *